US010798927B2

(12) United States Patent
da Rosa et al.

(10) Patent No.: US 10,798,927 B2
(45) Date of Patent: Oct. 13, 2020

(54) LIVE LINER DRAG DEVICE

(71) Applicant: Pure Fishing, Inc., Spirit Lake, IA (US)

(72) Inventors: Joaquim da Rosa, Lexington, SC (US); Mark Talwin, Lexington, SC (US); Cameron Ivie, Irmo, SC (US)

(73) Assignee: Pure Fishing, Inc., Spirit Lake, IA (US)

(*) Notice: Subject to any disclaimer, the term of this patent is extended or adjusted under 35 U.S.C. 154(b) by 62 days.

(21) Appl. No.: 16/155,986

(22) Filed: Oct. 10, 2018

(65) Prior Publication Data

US 2019/0110455 A1    Apr. 18, 2019

Related U.S. Application Data

(60) Provisional application No. 62/571,407, filed on Oct. 12, 2017.

(51) Int. Cl.
| | | |
|---|---|---|
| A01K 89/01 | (2006.01) | |
| A01K 89/015 | (2006.01) | |
| A01K 89/027 | (2006.01) | |

(52) U.S. Cl.
CPC .......... *A01K 89/0185* (2015.05); *A01K 89/03* (2015.05)

(58) Field of Classification Search
CPC .... A01K 89/028; A01K 89/029; A01K 89/03; A01K 89/0185
See application file for complete search history.

(56) References Cited

U.S. PATENT DOCUMENTS

| | | | | |
|---|---|---|---|---|
| 4,813,626 | A | | 3/1989 | Sakumoto |
| 5,120,001 | A | | 6/1992 | Kaneko |
| 5,322,238 | A | * | 6/1994 | Hitomi ................ A01K 89/02 242/246 |
| 5,511,735 | A | * | 4/1996 | Kaneko ............ A01K 89/027 241/262 |
| 5,547,141 | A | * | 8/1996 | Yeh .................. A01K 89/004 242/270 |
| 5,816,516 | A | | 10/1998 | Yamaguchi |
| 5,865,386 | A | | 2/1999 | Tao |

(Continued)

FOREIGN PATENT DOCUMENTS

| | | |
|---|---|---|
| EP | 0429923 B1 | 3/1996 |
| EP | 0649595 B1 | 1/1998 |
| JP | 2016082902 A | 5/2016 |

OTHER PUBLICATIONS

DAM Quick SLS—https://www.amazon.com/DAM-Quick-SLS-570-Baitrunner/dp/B00O32KV32, as early as Aug. 1, 2017.

(Continued)

*Primary Examiner* — Emmanuel M Marcelo
(74) *Attorney, Agent, or Firm* — Husch Blackwell LLP

(57) ABSTRACT

A drag device for use with a fishing reel is provided that allows an angler to switch between a main drag mode and a secondary drag mode. The main drag mode is traditionally used to provide drag when trying to reel in a fish, while the secondary drag mode is traditionally used to provide finely-tuned drag when fishing with live bait. The drag device preferably includes a lever member that, when engaged, causes the fishing reel to switch between the main drag mode and secondary drag mode, as well as adjust the drag force of the secondary drag.

15 Claims, 5 Drawing Sheets

(56) References Cited

U.S. PATENT DOCUMENTS

| | | | | |
|---|---|---|---|---|
| 2001/0030252 A1* | 10/2001 | Yamaguchi | ........ | A01K 89/0117 |
| | | | | 242/245 |
| 2005/0082405 A1* | 4/2005 | Sugawara | .............. | A01K 89/01 |
| | | | | 242/223 |
| 2005/0189446 A1* | 9/2005 | Myojo | ............. | A01K 89/01121 |
| | | | | 242/231 |
| 2007/0284466 A1* | 12/2007 | Bin Abd Razak | ... | A01K 89/029 |
| | | | | 242/246 |
| 2010/0308148 A1* | 12/2010 | Ng | ......................... | A01K 89/03 |
| | | | | 242/243 |
| 2016/0174536 A1* | 6/2016 | Chan | ...................... | A01K 89/00 |
| | | | | 242/233 |
| 2019/0082668 A1* | 3/2019 | Ivie | ...................... | A01K 89/047 |

OTHER PUBLICATIONS

Daiwa Infinity X—http://www.daiwa-cormoran.info/dw/en/products_ 1/bite_n_run_reels/infinity_x_br/5,1,77,75,1,1__products-model. htm?ovs_prdrows2=10&ovs_search0=infinity%20x&sid=xljlbeupewy &stamp=1499112193, as early as Aug. 1, 2017.

* cited by examiner

LIVE LINER DRAG DEVICE

CROSS REFERENCE TO RELATED APPLICATIONS

This application claims priority to U.S. Provisional Application Ser. No. 62/571,407 filed on Oct. 12, 2017.

FIELD OF THE INVENTION

The present disclosure is generally directed to a lever for use with a fishing reel. More particularly, the invention is directed to a lever for selecting between a main drag and a secondary drag, wherein the secondary drag may be adjusted to select a desired amount of drag.

BACKGROUND OF THE INVENTION

Fishing with live bait, such as minnows and other small fish, can be particularly difficult with a standard fishing reel, which has little to no drag control. Without fine-tuned control of the drag, the drag may be set too low, allowing bait to swim almost freely away from the angler. Landing a fish that has been hooked from such a distance can prove especially challenging. Alternatively, the reel may be set with too much drag, which prevents the live bait from swimming freely. When live bait is heavily restricted, it is unable to mimic natural movements. Fish are then less likely to view the bait as natural prey, and are therefore less tempted to take the bait. Main drags are generally very difficult to adjust, especially while fishing.

Thus, many fishermen turn to spinning reels that have dual drags. Such reels often include a main drag and a secondary drag. Secondary drags generally generate single-digit pounds of pressure to create a tension-controlled free-spool, like a more conventional reel. By providing a secondary drag that has reduced tension, live bait may substantially freely swim around to mimic the natural movements that it would make if it were not attached to a line. It is also important to be able to quickly switch from a low drag setting to a higher drag. Fish can be skeptical to take a bait if they feel the tension created from the line. The light drag setting will allow the fish to consume a bait without feeling the line tension, and then allow the angler to quickly change to a higher drag setting to hook and fight the fish.

Some solutions on the market provide for a secondary "live line" or drag. However, those solutions often are embodied as a drag knob. Such knobs have many points or spaces for water intrusion and can often lead to water leaks within the drag knob. Often, the drag knobs are secured only by a C-shaped retainer clip that makes sealing the drag knob from water and other fluids difficult. When the drag knob is not properly sealed, dried salt water leaves behind salt crystals that can clog or bind the system. Over time, the salt crystals can make the drag knob dysfunctional.

There are some solutions in the market that use a lever, but those solutions only use the lever to switch from a main drag to a secondary live line. After switching to the secondary live line, an angler still must fine tune the strength of the drag by using a drag knob. However, such a knob, like the above described drag knob, is susceptible to the damage described above, and it further requires the use of multiple hand motions.

Thus there is a need in the market for a secondary live line drag which does not use a drag knob. The solution should be easy to use, and it should be adjustable such that drag force applied by the secondary drag may be fine-tuned. Preferably, the design also allows an angler to engage and adjust the secondary drag with the same hand in one motion, and it should allow for a more leak-resistant reel.

SUMMARY OF INVENTION

The present invention provides a lever member that allows a fishing reel to alternate between a main drag and a secondary drag. In the reel, a prior art drag knob (previously used to adjust the secondary drag) may be replaced with a cap member that better seals the interior of the fishing reel from outside elements. The lever member allows an angler to use the lever member to transition from the main drag to the secondary drag. Unlike prior art lever members, the lever member may also be used to adjust the secondary drag to a variety of tensions as desired depending on preference and/or the weight of the live bait being used.

The lever member may be in mechanical connection with a plurality of gears and/or levers that are contained within a housing of the reel. The mechanical connections, whether direct or indirect, preferably are also in mechanical communication with at least two washers. When the lever member is engaged, the mechanical connections between the lever member and the at least two washers are also engaged. As the lever member is further actuated, pressure—and thereby friction—between the washer members preferably increases. This causes an increase in the secondary drag.

The present invention thus allows an angler to simply and efficiently switch from a main drag to a controllable secondary drag, all using the same lever member. As such, it is possible that he or she could perform the function of switching from the main drag to the secondary drag using the same hand. The invention also improves the seal resistant nature of the reel itself.

DETAILED DESCRIPTION OF THE INVENTION

The present disclosure is directed to a fishing reel 1 that preferably includes a mode for employing each of a traditional main drag and a secondary drag. The main drag is preferably used when resisting a fish that an angler has on the hook, and the secondary drag is preferably used when using live bait. The secondary drag mode preferably helps to prevent the bait from straying too far, which could make it unnecessarily difficult to reel in and subsequently land a fish or allow the fish to take a bait without initially knowing that it is hooked.

Figure 1:
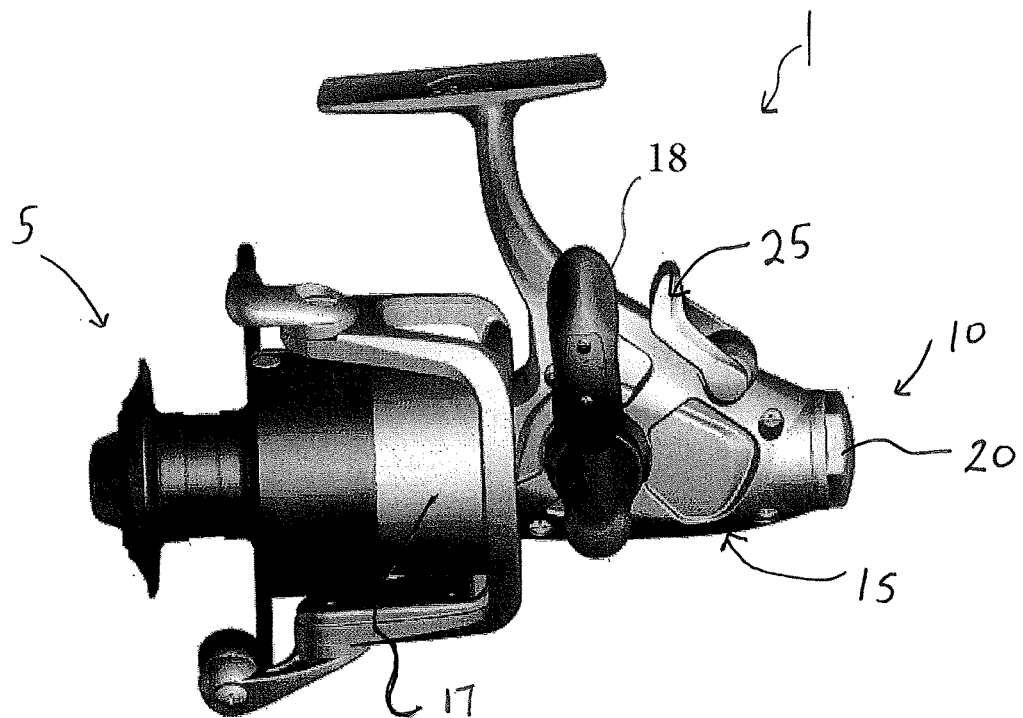
FIG. 1 is a perspective view of a fishing reel constructed according to the teachings of the present invention.

Turning first to FIG. 1, the fishing reel 1 is provided with each of a proximal end 5 and a distal end 10. The proximal end 5 preferably extends in the direction of a fishing rod (not illustrated, but long known and understood in the art) when in use and is away from an angler when the reel 1 is being used. The distal end 10 is preferably positioned extending away from the rod when the fishing reel 1 is being used, and it is preferably adjacent to an angler when the fishing reel 1 is being used.

The fishing reel 1 illustrated in FIG. 1 preferably includes a housing 15. The housing 15 may take on many shapes and sizes. The housing 15 preferably covers some or all of the interior components of the fishing reel 1 as discussed hereinbelow. Without sufficient protection from the housing 15, the various components within the reel 1 may be susceptible to the elements, including water intrusion. The fishing reel 1 also includes a spool assembly 17, a handle member 18 coupled to a central gear member 70 as will be further explained below with respect to FIG. 2 which, in turn, allows for rotational and reciprocal movement of a mainshaft 19 (FIGS. 2-4) which typically extends through the fishing reel 1 and through the housing 15, the spool assembly 17, and the main drag assembly.

At the distal end 10 of the fishing reel 1, the fishing reel 1 is preferably provided with a cap member 20. In prior art fishing reels, the distal end 10 of such fishing reels may be provided with a drag knob for adjusting a secondary drag as discussed above. In a preferred embodiment, the present cap member 20 acts as an additional seal to prevent water and other fluids from entering the fishing reel 1. The cap member 20 may be removable so that an angler may access the interior of the fishing reel 1 when necessary. In one embodiment, the cap member 20 may be made of machined aluminium and may further be anodized.

Near the distal end 10 of the fishing reel 1, a lever member 25 is also provided. When engaged, the lever member 25 preferably allows an angler to deactivate the main drag, and activate a secondary drag as will be described in greater detail below. The lever member 25 may then also be used to finely adjust the drag force created by the secondary drag. Preferably, the main drag is engaged by an angler to help resist a fish that is hooked, while the secondary drag is used to provide a more finely tuned drag for live bait. The manner in which the lever member 25 is used to switch between the main drag and the secondary drag and adjust the secondary drag force is described below in greater detail.

Figure 2:
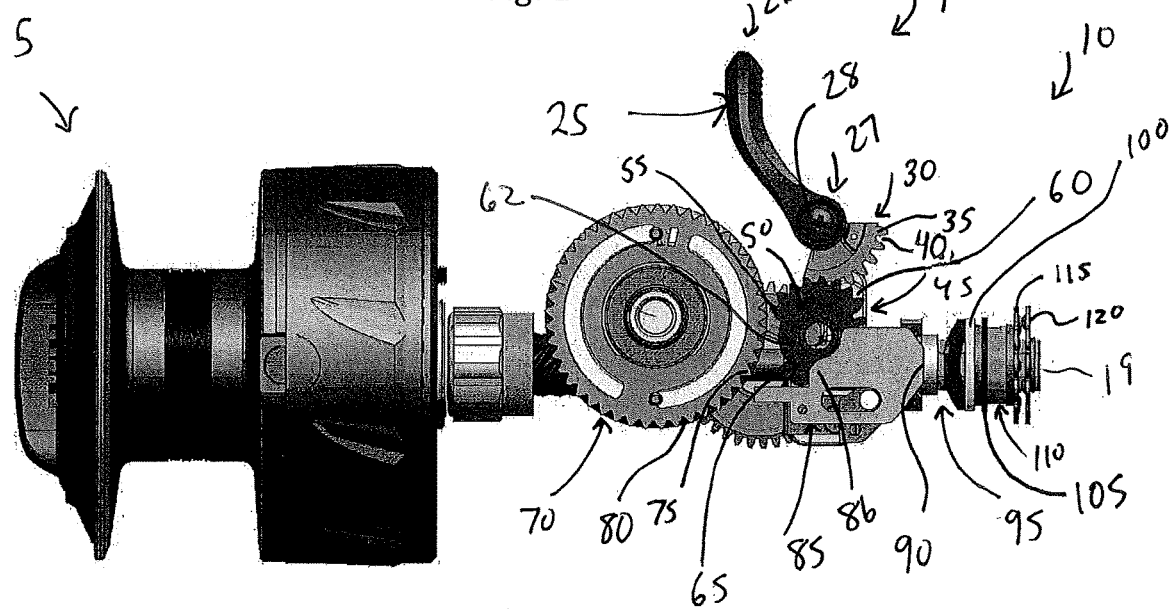
FIG. 2 is a left side elevational view of the fishing reel of FIG. 1 with its housing removed, in a first configuration where the secondary drag is disengaged.
Figure 3:
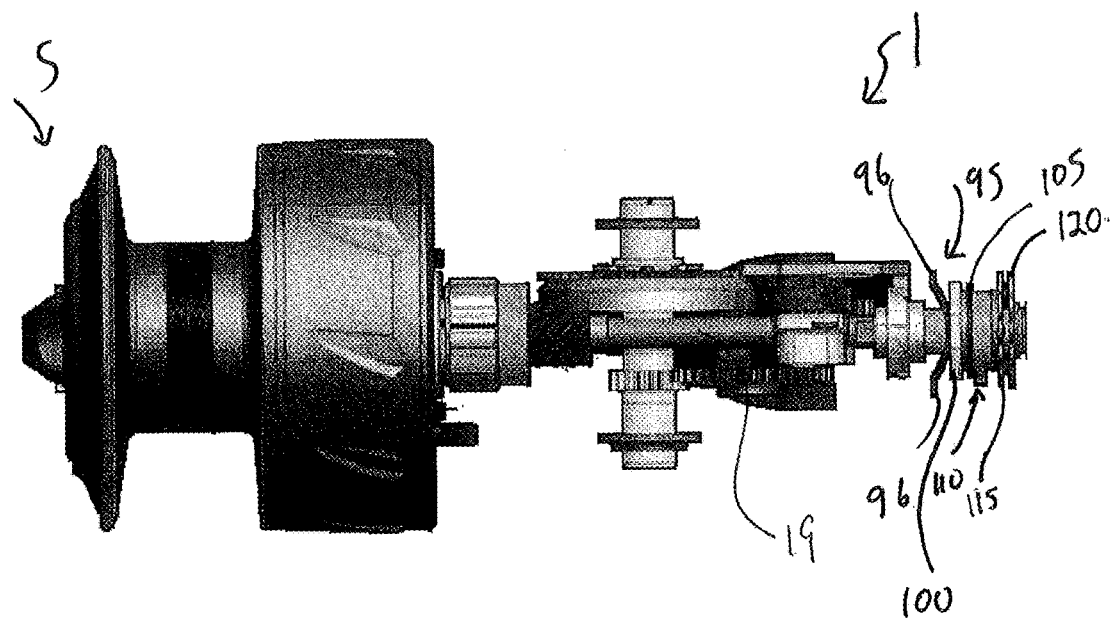
FIG. 3 is a bottom plan view of the fishing reel of FIG. 2 in its first configuration where the secondary drag is disengaged.
Figure 4:
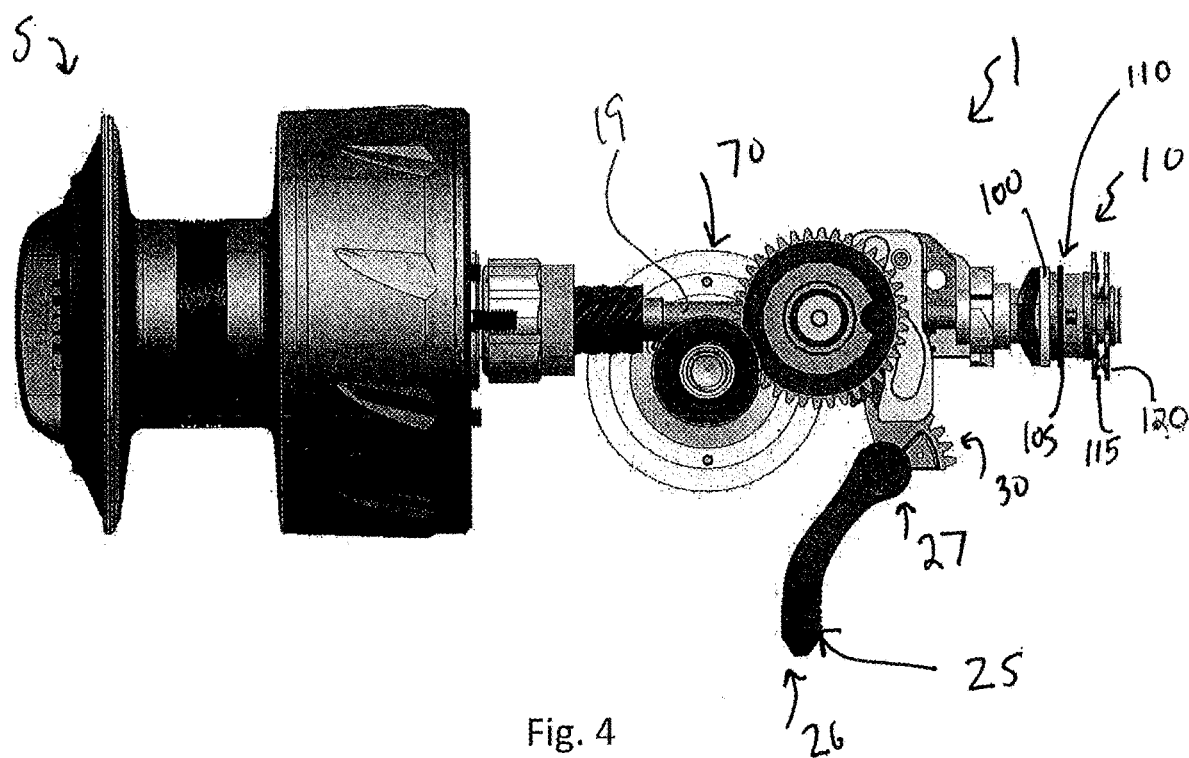
FIG. 4 is a right side elevational view of the fishing reel of FIGS. 2 and 3 in its first configuration where the secondary drag is disengaged.

In FIG. 2, the fishing reel 1 is illustrated with the housing 15 removed. As such, various interior components of the fishing reel 1 are illustrated in greater detail. FIGS. 3 and 4 also illustrate the fishing reel 1 and its various interior components from different angles. In FIGS. 2-4, the fishing reel 1 is illustrated with the lever member 25 in its first disengaged position. When referring herein to a disengaged position, the fishing reel 1 is configured such that the main drag is engaged in a manner commonly known and understood in the art and the secondary draft is disengaged. The engaged position refers to the configuration where the secondary drag is activated or engaged and the main drag is disengaged.

The lever member 25 preferably includes each of a proximal portion 26 and a distal portion 27. An angler may use the proximal portion 26 of the lever member 25 to adjust the fishing reel 1 between its engaged and disengaged positions. At the distal portion 27 of the lever member 25, the lever member 25 is preferably attached to a first gear member 30. In the illustrated embodiment, the lever member 25 is attached at its distal portion 27 to the first gear member 30 by a screw 28. In other embodiments, the lever member 25 may be more permanently attached to the first gear member 30 using foreseeable means, or may be otherwise engaged to the first gear member 30.

The first gear member 30 may comprise all or only a portion of a complete circle. In the illustrated embodiment, the first gear member 30 occupies an arc which is somewhat greater than 90°. In alternative embodiments, the gear member 30 may include a greater arc which encompasses a greater angle, depending on the angle of rotation that is preferred between the lever member 25 and the first gear member 30 as will be described below in greater detail. Like many gear members, the first gear member 30 preferably includes a plurality of teeth 35 and grooves 40 that alternate around at least a part of the circumference of the first gear member 30. The teeth 35 and the grooves 40 are preferably sized, as well as positioned and located, for selective engagement with a second gear member 45 that is positioned and located adjacent to the first gear member 30.

At an upper portion 50, the second gear member 45 is also preferably provided with a plurality of teeth 55 and grooves 60 that are selectively engageable with the grooves 40 and the teeth 35, respectively, of the first gear member 30. At a lower portion 62, however, the second gear member 45 is provided with a levered gear member 65 that projects outwardly from the second gear member 45. The function of the levered gear member 65 will be described in greater detail below when discussing the manner in which the fishing reel 1 switches between its disengaged and engaged modes. Toward its proximal end 5, the fishing reel 1 is further preferably provided with a central gear member 70.

The central gear member 70 is preferably positioned and located such that teeth 75 and grooves 80 that circumscribe the central gear member 70 are selectively engageable with the grooves 60 and the teeth 55, respectively, of the second gear 45 when the lever member 25 is actuated. The central gear member 70 is coupled to handle member 18 (FIG. 1) for moving the mainshaft 19 and the spool assembly 17 (FIG. 1). The interaction between the second gear 45 and the central gear 70 will be described in greater detail herein below when describing the manner in which the fishing reel 1 switches between its disengaged and engaged modes of operation.

An actuator 85 is preferably provided near the distal end 10 of the fishing reel 1. As shown in FIG. 2, when the fishing reel 1 is in its disengaged position, the actuator 85 is preferably in contact with the levered gear member 65 of the second gear 45 at a shoulder 86 of the actuator 85. The shoulder 86 is located closer to and facing the central gear 70 as shown in FIG. 2. Facing the distal end 10 of the fishing reel 1, the actuator 85 is provided with a nose member 90. When the lever member 25 is actuated, as will be described in greater detail hereinbelow in connection with FIGS. 5-8, a series of actions take place that ultimately results in the nose member 90 abutting a leaf spring 95 also located toward the distal end 10 of the fishing reel 1 and in front of nose member 90. The leaf spring 95, which may be a Belleville washer of the type known and understood in the art, or any other type of spring member, is preferably acted upon by the nose member 90 when the lever member 25 is activated. In an example embodiment, the leaf spring 95 is frusto-conically shaped such that it includes side portions 96 that extend upwardly and away from the center of the leaf spring 95 (see FIG. 3). It is this frusto-conical shape, with side portions 96, that preferably allows the leaf spring 95 to act as a spring and perform the function described below.

When acted upon by the nose member 90, the side portions 96 of leaf spring 95 preferably flex toward each of a first friction washer 100 and a second washer 105 which is keyed to the mainshaft 19 and located towards the distal end 10 of the fishing reel 1, thus applying a force to the washers 100, 105. In a manner known and understood in the art, when the first and second washers 100, 105 are pressed against one another, friction between the washers 100, 105 creates a drag force on the mainshaft 19 which is keyed to washer 105. Although the present embodiment uses only two washers 100 and 105 to create the drag force on the mainshaft 19, it is recognized and anticipated that any number of washers can be used and acted upon by leaf spring 95 to create the secondary drag force.

Turning now to FIGS. 5-8, the fishing reel 1 is illustrated in its engaged position, that is, the secondary drag force is engaged and the main drag force is disengaged. In those illustrations, an angler has pulled the proximal portion 26 of the lever member 25 rearwardly to its full downward position thereby fully engaging the secondary drag so that the friction between the washers 100, 105 forming the secondary drag is at or nearly at a maximum. In some embodiments, a plurality of stops or detents may be provided along the path of the lever member 25 as it moves from its first position to its fully engaged second bottom position as shown in FIGS. 5-8. In this embodiment, each stop or detent will allow an angler to adjust or select a different drag force for the secondary drag ranging from a value between zero and a certain maximum value. The stops may allow the angler to set the lever member 25 to a selected drag value, and then release the lever member 25 while maintaining the selected drag force. In this embodiment, factory settings can preferably set the secondary drag at those various stop positions. For example, in its first disengaged position, the actuator 85 locks the mainshaft 19 in place thereby engaging the main drag in a conventional manner. As the lever member 25 is moved progressively downwardly towards its fully engaged second bottom position, the main drag is disengaged and the secondary drag is engaged thereby progressively increasing the secondary drag force as the lever member 25 is moved downwardly. As the lever member 25 is moved out of its first position, actuator 85 is moved out of engagement with mainshaft 19, and when the mainshaft is released, the main drag is disengaged. At this stage, the secondary drag is not yet engaged and its drag force is at a minimum setting, namely zero. As the lever member 25 is moved further downwardly, the secondary drag is engaged and the drag force progressively increases. If stops or detents are used, each stop or detent would represent a different secondary drag force.

As the lever member 25 continues to move downwardly, the actuator 85 moves towards the distal end 10 of the reel and the nose member 90 starts to come into contact with the leaf spring 95. The leaf spring 95 compresses the washers 100 and 105 thereby creating the secondary drag force. The range of the secondary drag force is determined by how far the lever member 25 is moved downwardly. This allows a user to stop the lever member at any intermediate position between its first and second positions to select the amount of secondary drag force desired.

Figure 5:
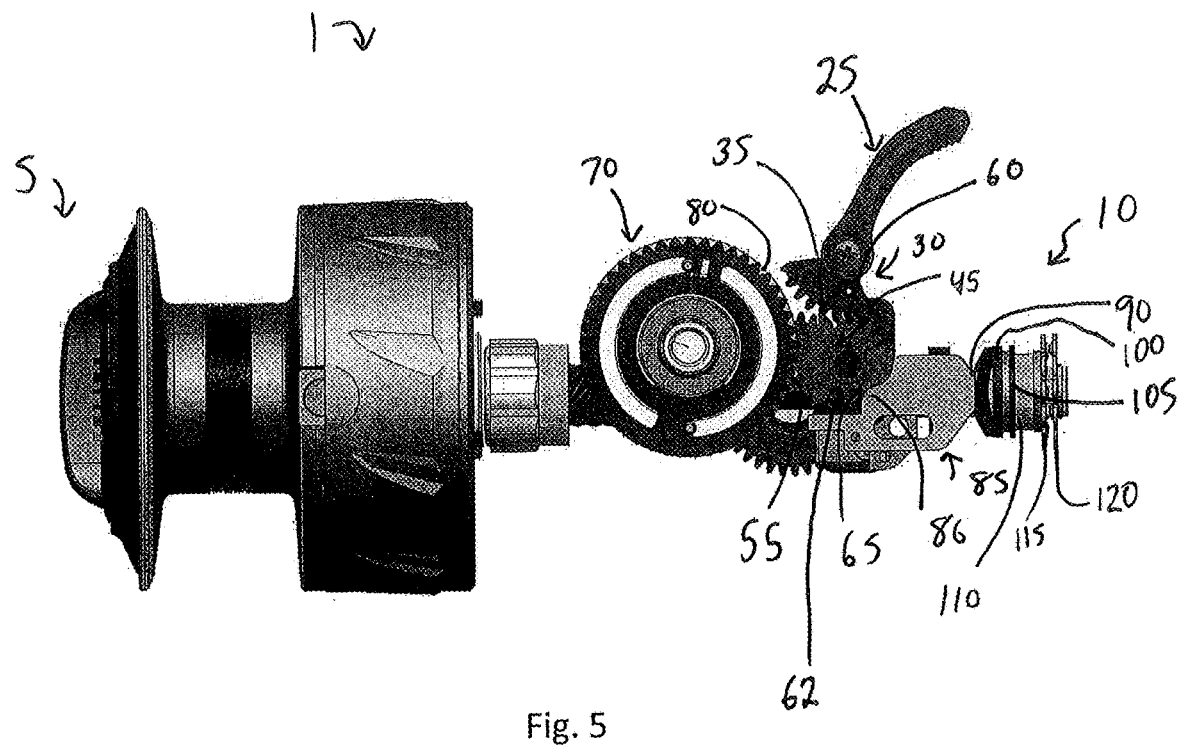
FIG. 5 is a left side elevational view of the fishing reel of FIG. 1 with its housing removed, in a secondary configuration where the secondary drag is engaged.
Figure 6:
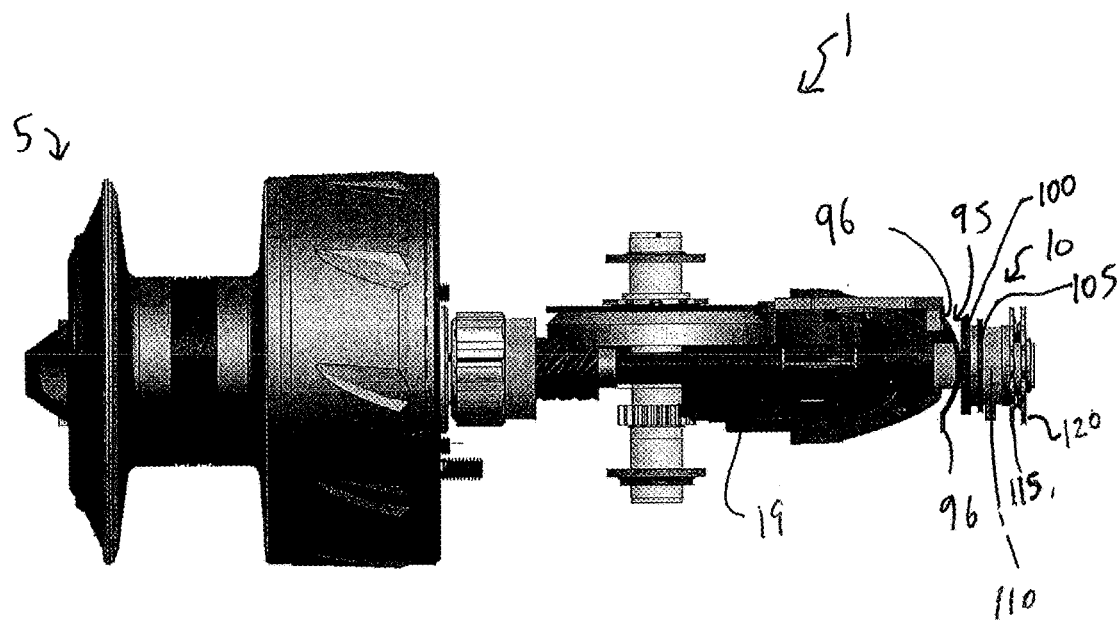
FIG. 6 is a bottom plan view of the fishing reel of FIG. 5 in its secondary configuration where the secondary drag is engaged.
Figure 7:
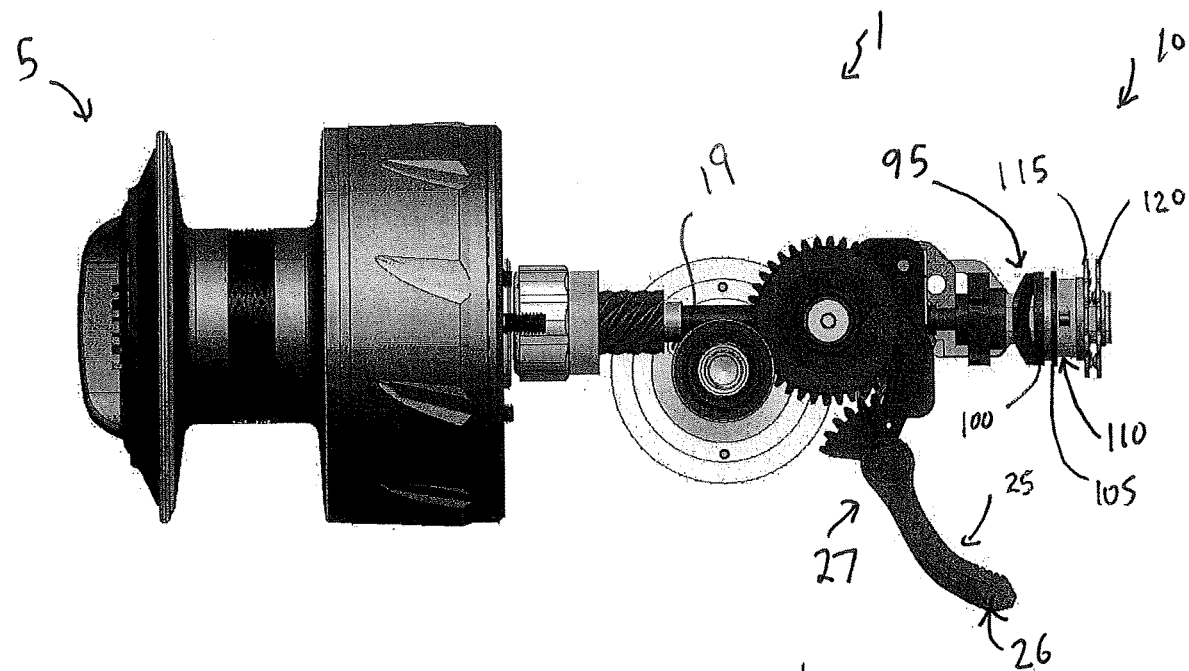
FIG. 7 is a right side elevational view of the fishing reel of FIGS. 5 and 6 in its secondary configuration where the secondary drag is engaged.
Figure 8:
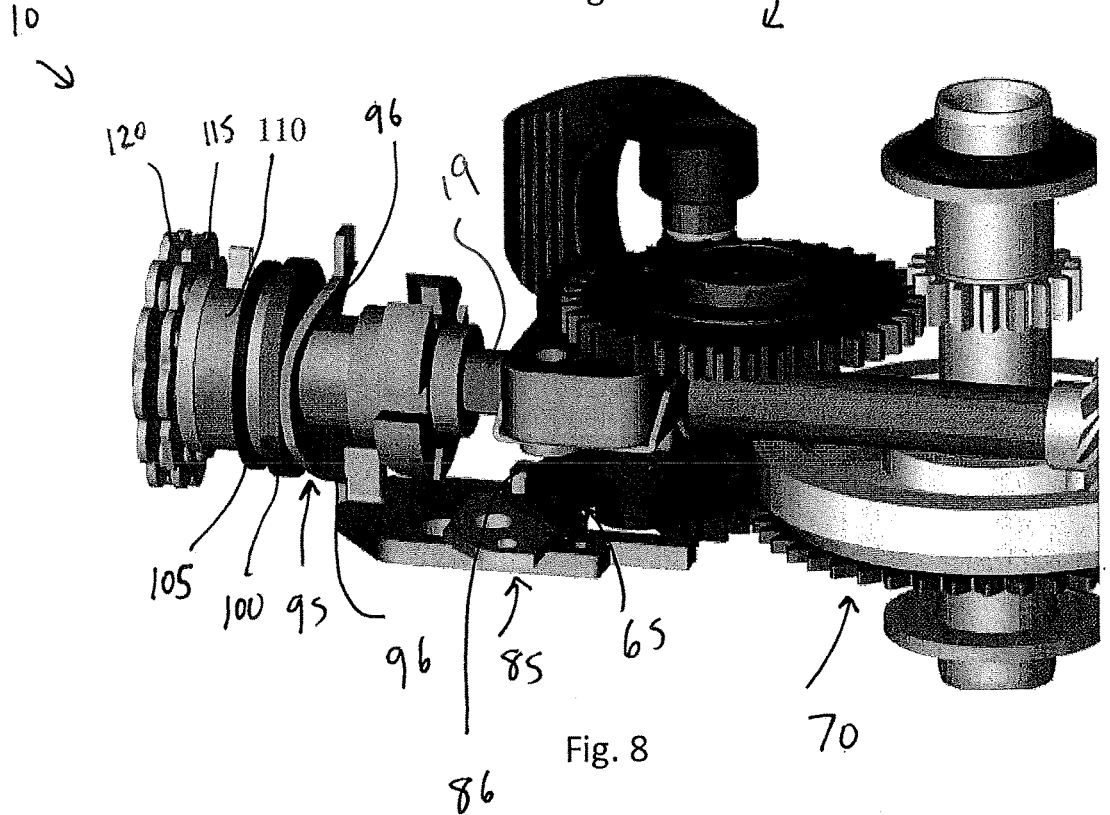
FIG. 8 is a partial enlarged perspective view of the fishing reel of FIGS. 5, 6, and 7 in its secondary configuration where the secondary drag is engaged.

More importantly, when the lever member 25 is pulled rearwardly or downwardly, the first gear member 30 to which the lever member 25 is attached rotates in a clockwise direction when viewed from the direction of FIG. 5. As the first gear member 30 rotates in a clockwise direction, its teeth 35 engage grooves 60 within the second gear member 45, and thus rotate the second gear member 45 in a counterclockwise direction. When the second gear member 45 moves in a counterclockwise direction, the teeth 55 of the second gear member 45 engage the grooves 80 of the central gear member 70, thus causing the central gear member 70 to move in a clockwise direction. As the second gear member 45 moves in a counterclockwise direction, its levered gear member 65 also moves in a counterclockwise direction thereby applying a force in a counterclockwise direction onto the shoulder 86 of the actuator 85. This force causes the actuator 85 to move toward the distal end 10 of the fishing reel 1 disengaging the mainshaft 19 and the main drag in a known manner as previously explained and as shown in FIGS. 5-8. Further downward movement of the lever member 25 causes the actuator 85 via nose member 90 to abut and apply a force on to the leaf spring 95 as likewise previously explained. The pressure applied on the leaf spring 95 causes a force to be applied to the first and second washers 100, 105 thereby causing a frictional force to be generated in the secondary drag which is applied to the mainshaft 19.

Adjustment washers 115 and 120 located at the distal end 10 of fishing reel 1 are used to improve the manufacturing variation in the secondary drag. These washers allow the factory to make adjustments to the secondary drag force in order to improve consistency from reel to reel. The adjustment of these washers affects the offset distance, which affects the secondary drag force at each setting. For example, if the second fully bottom position of lever member 25 is to create a 1 lb. drag force and when tested, the reel only has a 0.8 lb. drag force in this position coming off of the assembly line, the cylinder 110 which is located between the leaf spring 95 and the adjustment washers 115 and 120 may be used to adjust the orientation of the adjustment washers 115, 120 to achieve the 1 lb. requirement, or any other preferred drag force. This adjustment is made by removing the cap 20 to adjust the washers 115 and 120. Adjustment of washers 115 and 120 applies a greater or lesser force on washers 100 and 105 which affects the secondary drag force at each setting.

Figure 9:
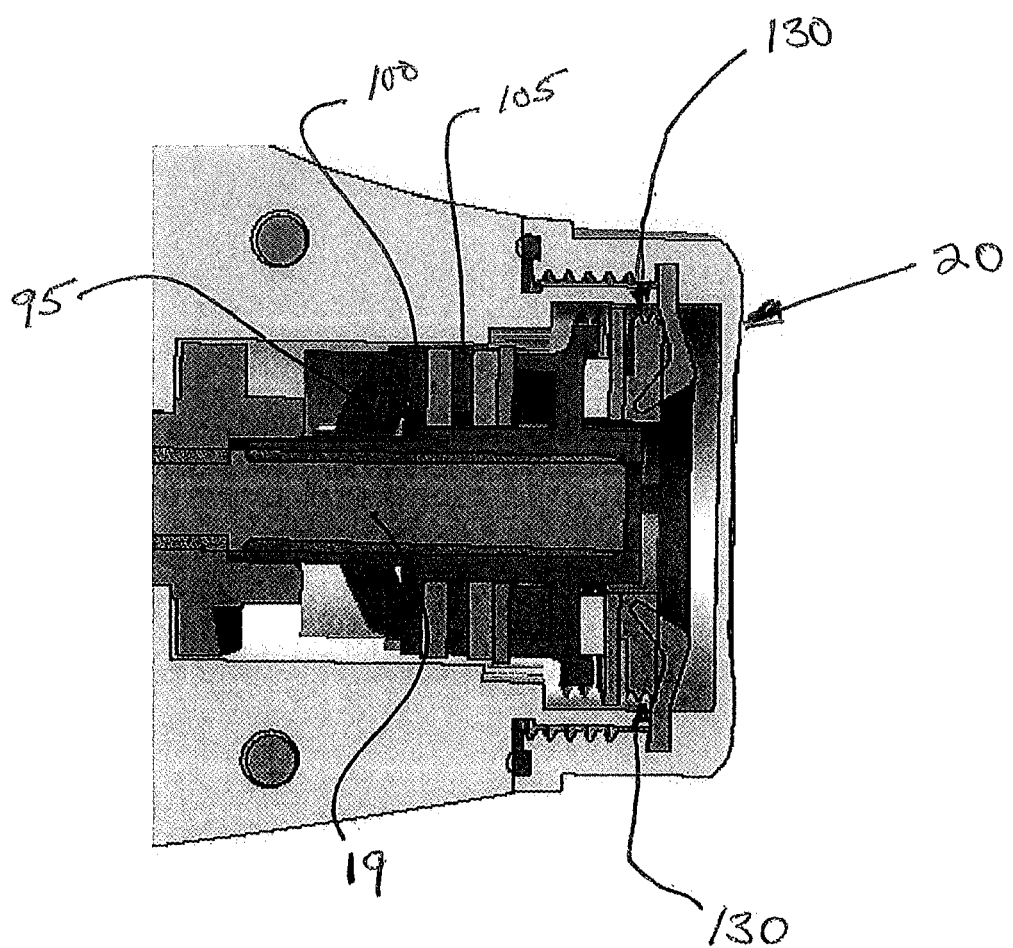
FIG. 9 is a partial side elevational view of the distal end of the fishing reel showing one embodiment of an adjustment screw mechanism for factory adjusting of the secondary drag force.

In an alternative embodiment, adjustment washers 115 and 120 may be replaced with the adjustment screw mechanism 130 illustrated in FIG. 9. The adjustment screw mechanism 130 is coupled to washers 100 and 105 such that rotation of screw mechanism 130 can apply a greater or lesser force to washers 100 and 105 as previously explained. This adjustment is made by removing cap 20 and using a tool or otherwise rotating the screw mechanism fore or aft to apply a greater or lesser force to washers 100 or 105. This adjustment will again impact the secondary drag force at each setting.

Although FIGS. 1-9 disclosed in the present application disclose the structure associated with one embodiment for allowing an angler to disengage the main drag force and selectively engage and adjust the secondary drag force, namely, using a lever member coupled to a gear assembly which in turn is coupled to an actuator which is coupled to a leaf spring for progressively increasing a force applied to at least two washers to selectively increase the force associated with the second drag assembly, it is recognized and anticipated that other structures may be used to progressively increase the force applied to the at least two washers or to any other mechanism utilized to generate the secondary drag force. The lever member, gear mechanism, actuator member, leaf spring and washer arrangement can be replaced with other structures including levers and other mechanisms which can generate a force on the mechanism used to increase the force associated with the secondary drag assembly. In a preferred embodiment, the lever member is coupled to the at least two washers used in the present embodiment for generating the secondary drag force and movement of the lever member between its first and second positions progressively increases the force applied to the at least two washer members to selectively increase the force associated with the secondary drag assembly. Other structures and arrangements are likewise envisioned.

As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A drag device for a fishing reel including a mainshaft for alternating between a main drag assembly and an adjustable secondary drag assembly, the drag device comprising:
a lever member associated with the fishing reel, said lever member being movable between a first position and a second position;
at least two washers coupled to said lever member, at least one of said washers being rotationally coupled to the mainshaft of the fishing reel;
wherein when said lever member is moved out of its first position, the main drag assembly is disengaged, and as said lever member is moved towards its second position the secondary drag assembly is engaged; and
wherein as said lever member is progressively moved towards its second position, a progressively increasing force is applied to the at least two washers to selectively increase the force associated with the secondary drag assembly.

2. The drag device of claim 1 further including a gear assembly attached to one end portion of said lever member; an actuator in mechanical communication with said gear assembly, said actuator being coupled to said at least two washers for applying a force to said at least two washers when said lever member is moved from its first position to its second position.

3. The drag device of claim 2 further including a leaf spring in mechanical communication with said actuator, said leaf spring progressively compressing said at least two washers when said lever member is moved from its first position to its second position thereby causing an adjustable force to be generated by the secondary drag assembly.

4. The drag device of claim 3 wherein said actuator includes a nose portion at a distal end of said actuator, said leaf spring being in mechanical communication with the nose portion of said actuator.

5. The drag device of claim 2 wherein said gear assembly includes a first gear member attached to a distal portion of said lever member, a second gear member in mechanical communication with said first gear member, said second gear member including a lower levered portion, and a central gear member in mechanical communication with the second gear member.

6. The drag device of claim 5 wherein said second gear member includes an upper geared portion, said central gear member being in mechanical communication with the upper geared portion of said second member.

7. The drag device of claim 1 including at least two adjustment washers located at a distal end of the fishing reel for adjusting the force between the at least two washers.

8. The drag device of claim 1 including an adjustment screw mechanism located at a distal end of the fishing reel for adjusting the force between said at least two washers.

9. An adjustable secondary drag device for use on a fishing reel for varying the force generated by the secondary drag device, the fishing reel including a mainshaft, the secondary drag device comprising:
a lever member coupled to a gear mechanism, said lever member being movable between a first position and a second position;
an actuator coupled to said gear mechanism; and
at least two washers coupled to said actuator, at least one of said washers being keyed to the mainshaft of the fishing reel;
wherein when said lever member is moved out of its first position and is progressively moved towards its second position, a progressively increasing force is applied to the at least two washers to selectively increase the force generated by the secondary drag device.

10. The secondary drag device of claim 9 including at least two adjustment washers located at a distal end of the fishing reel for adjusting the force between the at least two washers.

11. The secondary drag device of claim 10 including an adjustment screw mechanism located at the distal end of the fishing reel for adjusting the force between the at least two washers.

12. The secondary drag device of claim 9 wherein the fishing reel includes at main drag assembly, the main drag assembly being disengaged when said lever member is moved out of its first position.

13. The secondary drag device of claim 9 including a leaf spring coupled to said actuator, said leaf spring progressively compressing said at least two washers when said lever member is moved from its first position to its second position.

14. The secondary drag device of claim 13 wherein the actuator includes a nose portion at a distal end of said actuator, said nose portion being in mechanical communication with said leaf spring.

15. The secondary drag device of claim 9 wherein said gear mechanism includes a first gear member attached to a distal end of said lever member, a second gear member in mechanical communication with said first gear member, the second gear member including a lower levered portion, and a central gear member in mechanical communication with said second gear member, said actuator being in mechanical communication with the lowered levered portion of said second gear member.

\* \* \* \* \*